United States Patent [19]

Komamura et al.

[11] Patent Number: 5,476,943
[45] Date of Patent: Dec. 19, 1995

[54] DYE AND HEAT SENSITIVE TRANSFER MATERIAL COMPRISING THE SAME

[75] Inventors: Tawara Komamura; Katsunori Katoh; Tatsuo Tanaka, all of Hino, Japan

[73] Assignee: Konica Corporation, Tokyo, Japan

[21] Appl. No.: 212,003

[22] Filed: Mar. 11, 1994

[30] Foreign Application Priority Data

Mar. 22, 1993 [JP] Japan ..................... 5-061853
Sep. 22, 1993 [JP] Japan ..................... 5-236760

[51] Int. Cl.⁶ ................................. C07D 487/04
[52] U.S. Cl. ........................................... 546/271
[58] Field of Search ........................ 546/271, 121, 546/193, 194; 544/281, 350

[56] References Cited

U.S. PATENT DOCUMENTS 4,910,187  3/1990  Sato et al. ..................... 503/227
5,270,284  12/1993  Kanto et al. ..................... 503/227

FOREIGN PATENT DOCUMENTS 63194  3/1989  Japan.
89287  3/1992  Japan.
178646  6/1992  Japan.
239367  9/1993  Japan.

*Primary Examiner*—Richard L. Raymond
*Attorney, Agent, or Firm*—Frishauf, Holtz, Goodman, Langer & Chick

[57] ABSTRACT

An image forming dye and a heat sensitive transfer material comprising the same are disclosed, the dye being represented by the following Formula (1):

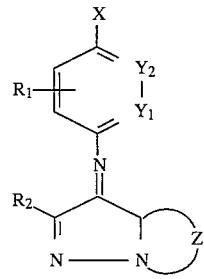

9 Claims, 1 Drawing Sheet

DYE AND HEAT SENSITIVE TRANSFER MATERIAL COMPRISING THE SAME

FIELD OF THE INVENTION

The present invention relates to a novel dye for an image forming dye usable in an image forming method using a heat sensitive transfer material, a photographic light sensitive material or an ink jet image forming material. More specifically, the present invention relates to a dye improved in image preservability and absorption characteristics and a heat sensitive transfer material using the dye.

BACKGROUND OF THE INVENTION

As a simple dry process for obtaining images, particularly full color images, there is known a method which uses a heat sensitive transfer material. In such a heat sensitive material, a dye used to form color images is of especial importance, and there have been proposed a variety of dyes for this purpose. The dye for color image formation is required to have good absorption characteristics including a sharp spectral absorption less in secondary absorption and a high spectral absorption coefficient as well as high stabilities to heat and light. Further, it is also important that the dye can be easily synthesized and readily dissolved in a solvent. Japanese Pat. O.P.I. Pub. No. 63194/1989 proposes a heat transfer material which uses a specific magenta dye. The heat sensitive transfer material which uses the dye disclosed in the above patent can form images of good hue and, further, has a high sensitivity because the dye itself has a high molar absorption coefficient, so that the pending problems of heat sensitive image transfer can be solved in those respects. However, it has a defect that the light fastness of images is considerably low. With the object of eliminating the defect in light fastness, Japanese Pat. O.P.I. Pub. No. 178646/1992 proposes a pyrazoloazole azomethine dye having a specific atomic group in its dye structure and a heat sensitive transfer material using the dye. However, the dye disclosed in said patent has disadvantages that its synthesis needs a complicated procedure and that when used in a heat sensitive material, it lowers the sensitivity because of its large molecular weight due to an atomic group introduced into it.

SUMMARY OF THE INVENTION

Figure 1:
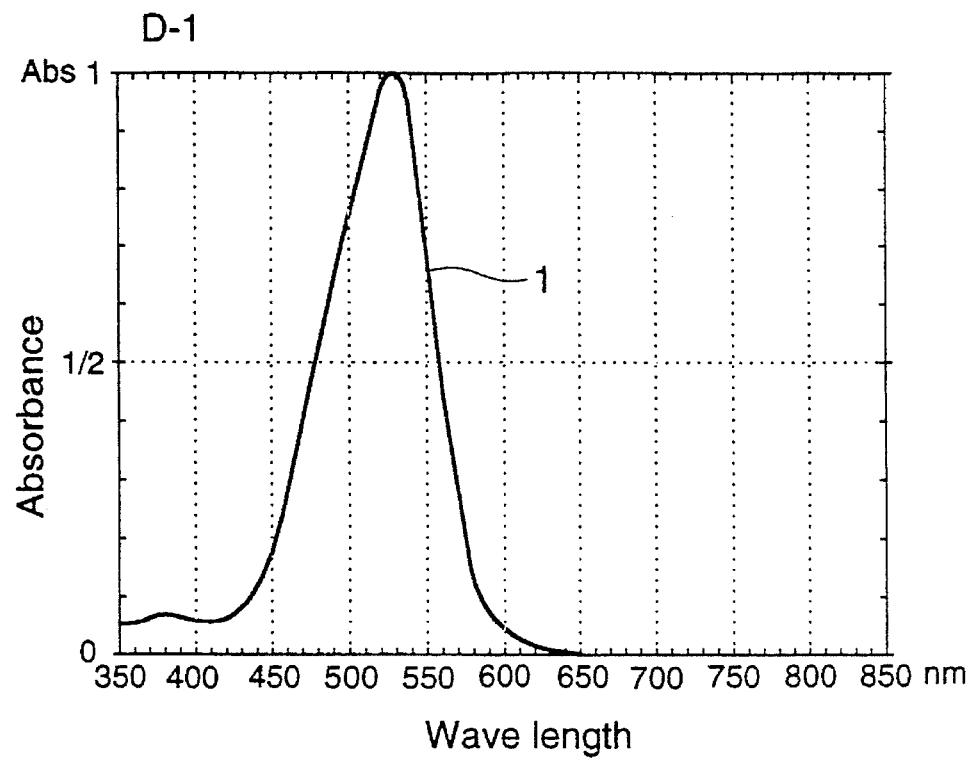
FIG. 1 shows spectral absorption spectra of dye D-1 of the invention.
Figure 2:
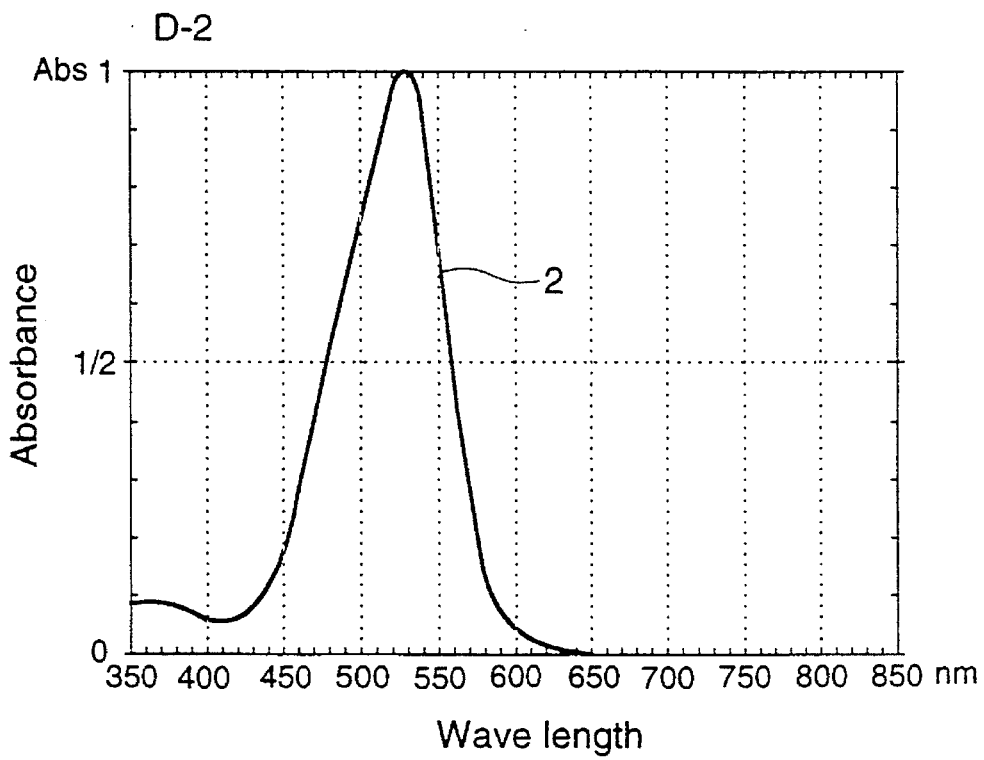
FIG. 2 shows spectral absorption spectra of dye D-2 of the invention.

Accordingly, the subject of the present invention is to improve the existing technique on the matter.

It is an object of the present invention to provide not only a dye excellent in stabilities to heat and light but also a heat sensitive transfer material using the dye.

It is a further object of the present invention to provide not only a dye sharp in spectral absorption, less in secondary absorption and high in spectral absorption coefficient but also a heat sensitive transfer material using the dye.

It is a still another object of the present invention to provide a dye which can be easily synthesized and readily dissolved in a solvent.

As a result of studies, the present inventors have found that the above objects of the invention are attained by the following constituents:

1. A dye represented by the following Formula (1):

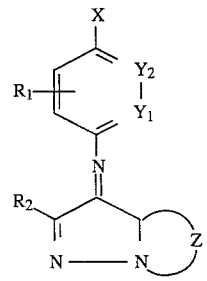

wherein X represents a $N(R_3)$ $(R_4)$ group or a hydroxyl group, wherein $R_3$ and $R_4$ may be same or different and independently represent a substituted or unsubstituted alkyl alkenyl, aryl, aralkyl or cycloalkyl group, provided that $R_3$ and $R_4$ may combine with each other or with $R_1$ to form a ring; $Y_1$ and $Y_2$ independently represent a carbon atom or a nitrogen atom, provided that one of $Y_1$ and $Y_2$ is a nitrogen atom; Z represents an atomic group necessary to form a substituted or unsubstituted 5- or 6-membered nitrogen-containing heterocyclic ring which may be condensed with another ring; $R_1$ represents a hydrogen atom, a halogen atom or a monovalent substituent; $R_2$ represents a monovalent substituent, provided that one of $R_2$ and a substituent on the ring represented by Z has a Hammett's value of not less than $-0.05$.

2. A heat sensitive transfer material comprising a support and provided thereon a layer containing a dye and a binder, wherein the dye is represented by the above Formula (1).

DETAILED DESCRIPTION OF THE INVENTION

The compound represented by Formula (1) is described in more detail.

X represents a $N(R_3)$ $(R_4)$ group or a hydroxyl group, wherein $R_3$ and $R_4$ independently represent an alkyl group (e.g., methyl, ethyl, propyl), an alkenyl group (e.g., propenyl), an aryl group (e.g., phenyl), an aralkyl group (e.g., benzyl), a cycloalkyl group (e.g., cyclohexyl, cyclopentyl), provided that $R_3$ and $R_4$ may combine with each other or with $R_1$ to form a ring; but, X is preferably a $N(R_3)$ $(R_4)$ group wherein both $R_3$ and $R_4$ are substituted or unsubstituted lower alkyl groups. Examples of the substituent include a hydroxyl group, an alkoxy group, a cyano group, an alkylsulfonylamino group or a halogen atom. Further, $R_3$ and $R_4$, or $R_3$ and $R_1$, may combine with each other to form a 5- or 6-membered ring. $R_1$ represents a hydrogen atom, a halogen atom (e.g., fluorine, chlorine) or a monovalent group, wherein the monovalent group is a substituted or unsubstituted alkyl group, cycloalkyl group, alkoxy group, aryl group, aryloxy group, aralkyl group, acylamino group, sulfonylamino group, ureido group, alkylthio group, alkoxycarbonyl group, carbamoyl group, acyl group, amino group, sulfonyl group, sulfamoyl group or alkoxycarbonyl group, and preferably an alkyl group or an alkoxy group. $R_2$ represents a monovalent substituent such as an alkyl group, a cycloalkyl group, an alkoxy group, an aryl group, an aryloxy group, an aralkyl group, an acyl group, a sulfonylamino group, a ureido group, an alkylthio group, an alkoxycarbonyl group, a carbamoyl group, an acyl group, an amino group, a cyano group, an alkylsulfonyl group, an alkylsulfinyl group, a sulfamoyl group or an alkoxycarbonyl group, each of which may have a substituent Further, at least one of $R_2$ and the substituents on the ring represented by Z is a substituent having a Hammett's value not less than −0.05; examples thereof include an aryl group (e.g., phenyl), a halogen-substituted alkyl group (e.g., trifluoromethyl, trichloromethyl, tetrafluoroethyl), a cyano group, an alkylsulfonyl group (e.g., methanesulfonyl), an alkylsulfinyl group (e.g., methanesulfinyl), a sulfamoyl group (e.g., diethylsulfamoyl), a carbamoyl group (e.g., diethylcarbamoyl) and an alkoxycarbonyl (e.g., methoxycarbonyl). Among the dyes represented by Formula (1), particularly preferred is a dye represented by the following Formula (2) or (3):

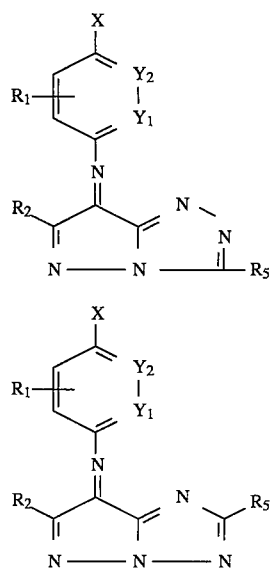

Formula (2)

Formula (3)

wherein $R_1$, $R_2$, X, $Y_1$ and $Y_2$ independently represent the same as those defined in formula (1); and $R_5$ is selected from the group consisting of an alkyl group, a cycloalkyl group, an alkoxy group, an aryl group, an aryloxy group, an aralkyl group, an acylamino group, a sulfonylamino group, a ureido group, an alkylthio group, an alkoxycarbonyl group, a carbamoyl group, an acyl group, an amino group, a cyano group, an alkylsulfonyl group, an alkylsulfinyl group or a sulfamoyl group each of which may have a substituent, provided that one of $R_2$ and $R_5$ has a Hammett's value of not less than −0.05. Examples of $R_2$ or $R_5$ in Formulas (2) and (3) are selected from the group consisting of an aryl group (e.g., phenyl), a halogen substituted alkyl group (e.g., trifluoromethyl, trichloromethyl, tetra-fluoroethyl), a cyano group, an alkylsulfonyl group (e.g., methanesulfonyl), an alkylsulfinyl group (e.g., methanesulfinyl), a sulfamoyl group (e.g., diethylsulfamoyl), a carbamoyl group (e.g., diethylcarbamoyl) and an alkoxycarbonyl group (e.g., methoxycarbonyl).

The Hammett's value of the present invention is described on pages 99 to 121 of "Kagaku no Ryouiki", Extra number 122nd published by Nankodo on Mar. 1, 1980.

In view of obtaining a satisfactory sensitivity, storage stability and solubility, it is preferred that the dye of the invention has a molecular weight of 350 to 550 when used in a heat sensitive transfer material.

Typical examples of the dyes of the invention include the following compounds:

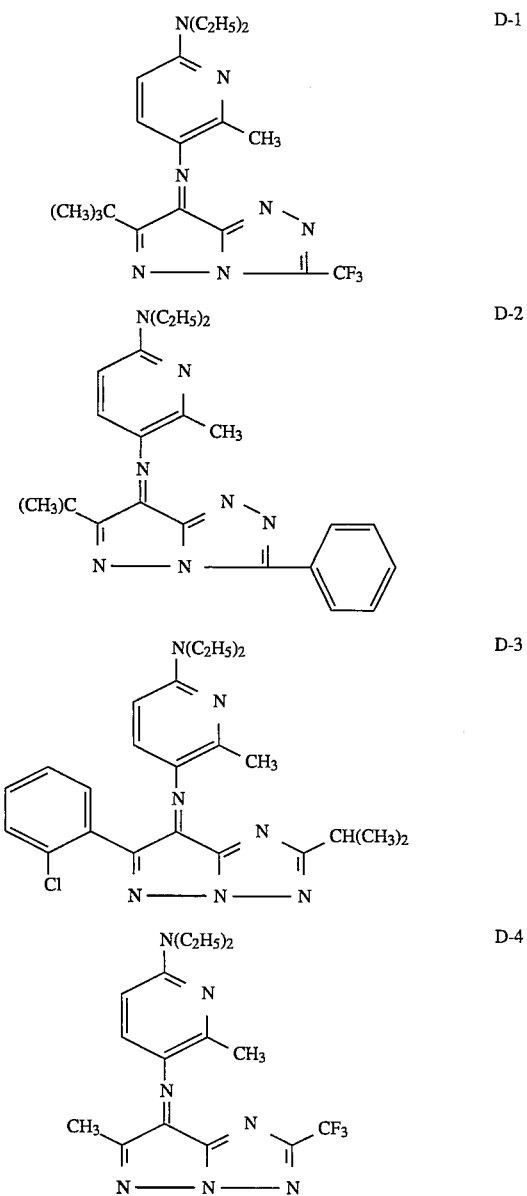

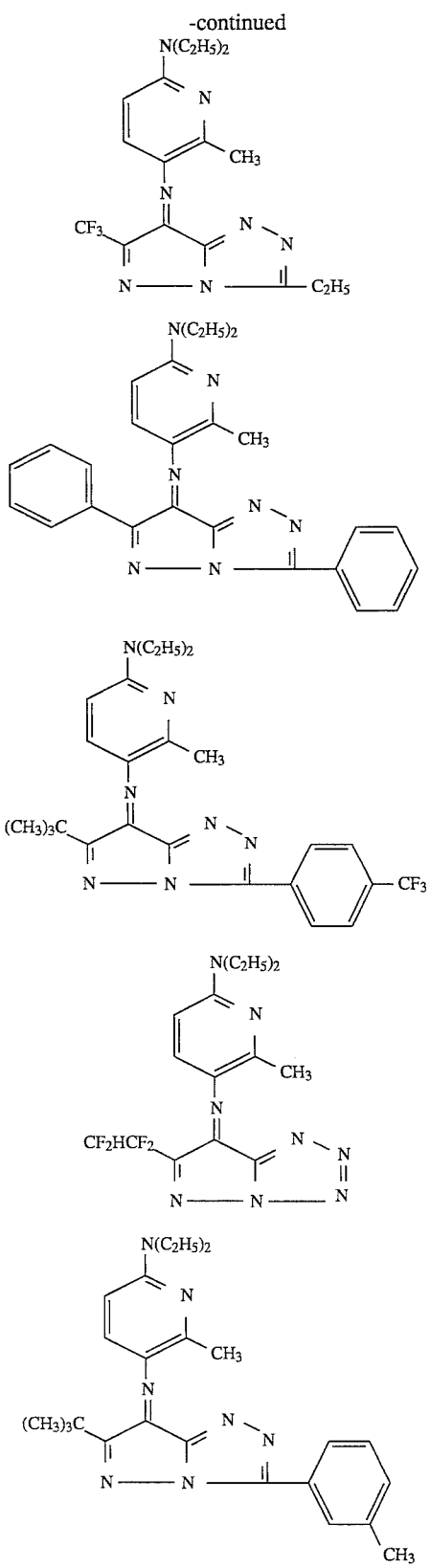
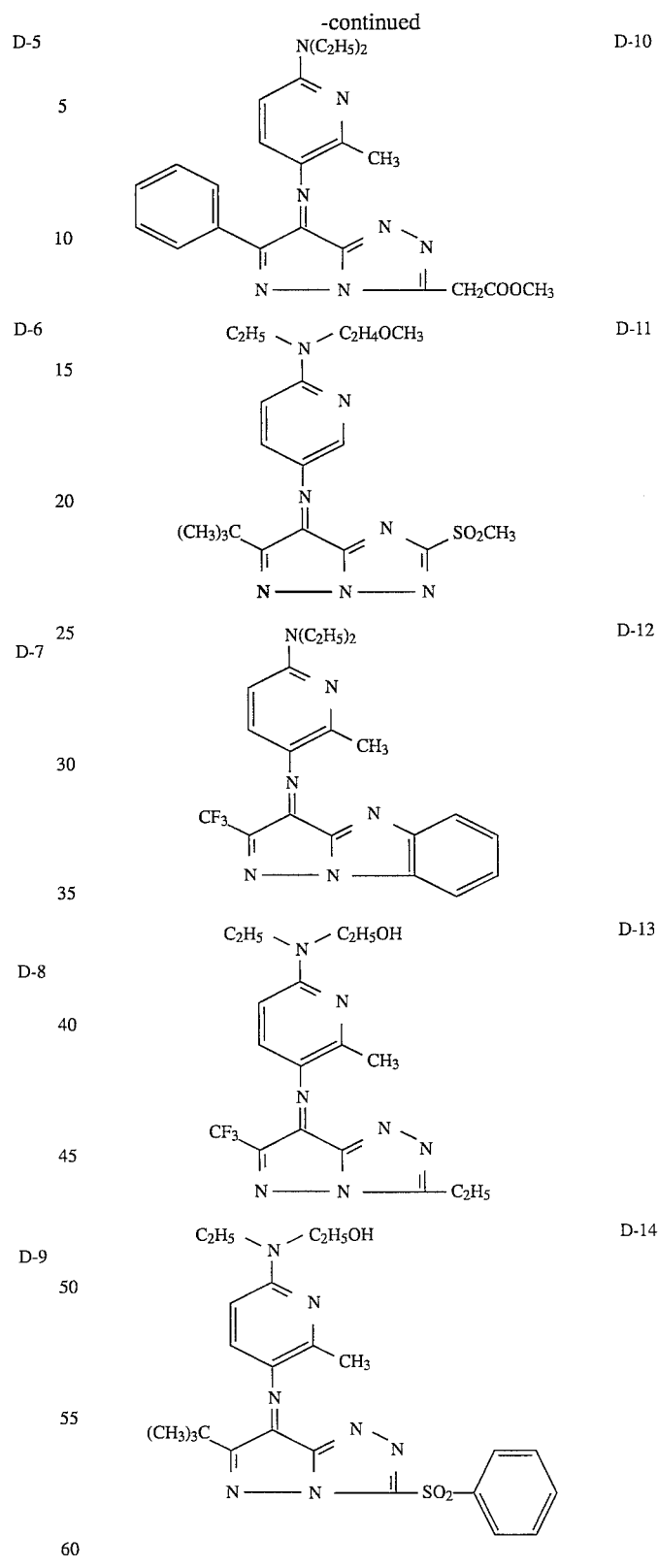

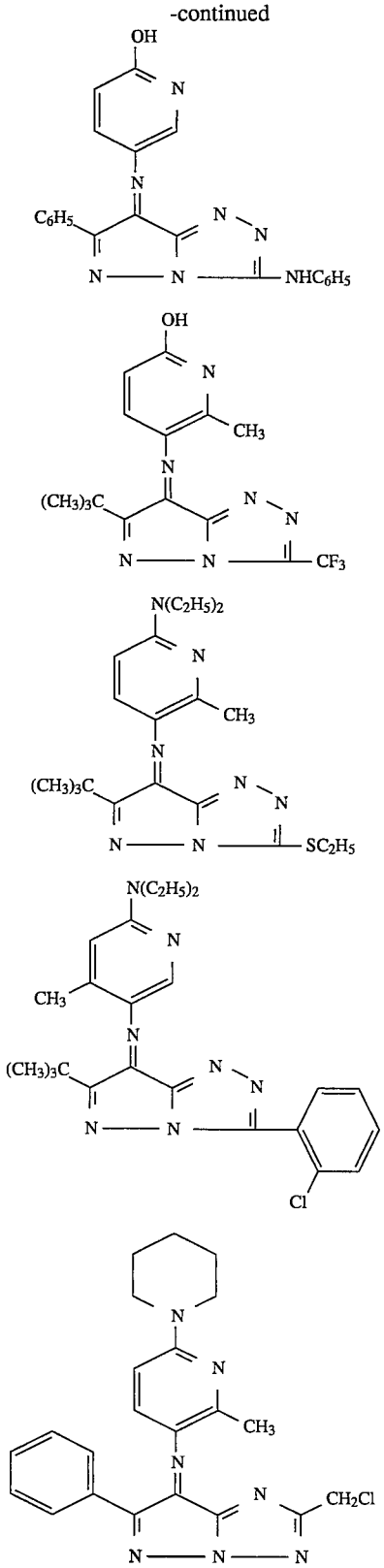

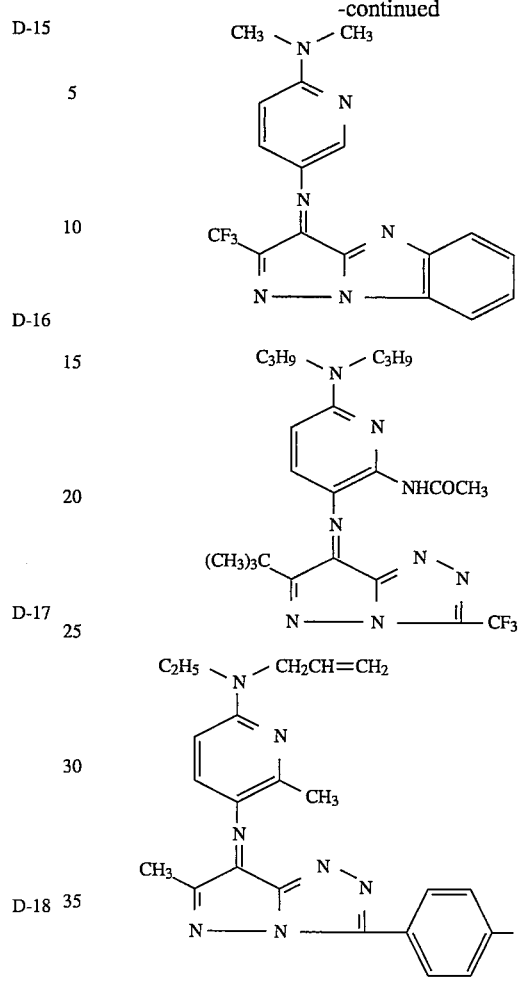

The dye of the invention is prepared by coupling reaction of a coupler with a compound represented by formula (5) in an aqueous or organic solvent solution under an alkaline condition in the presence of an oxidizing agent. The organic solvent includes methanol, ethanol, ethylacetate, tetrahydrofuran, dimethylformamide, acetone, toluene or acetonitrile. Methanol or ethylacetate is preferably used. The alkali agent includes an organic or inorganic alkali agent, for example, pyridine, triethylamine, dimethylaniline, sodium hydroxide, potassium hydroxyde, sodium carbonate, potassium carbonate, sodium bicarbonate, potassium bicarbonate or sodium acetate. Triethylamine, potassium hydroxyde or potassium carbonate is preferably used. The oxidizing agent includes silver oxide, potassium persulfate, ammonium persulfate, potassium ferricyanide, hydrogen peroxide or sodium chlorite. Potassium persulfate or ammonium persulfate is preferably used.

Formula (4)     Formula (5)

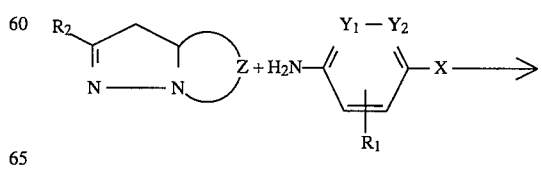

Formula (1)

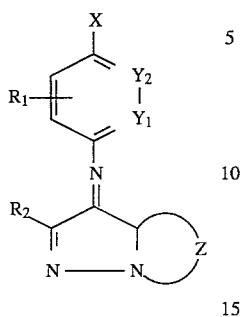

The coupler represented by formula (4) is prepared by a method described in Japanese Patent O.P.I. Publication Nos. 63-231341/1988 and 2-201443/1991.

The compound represented by formula (5) is prepared by the method described below (Route 1).

Route 1

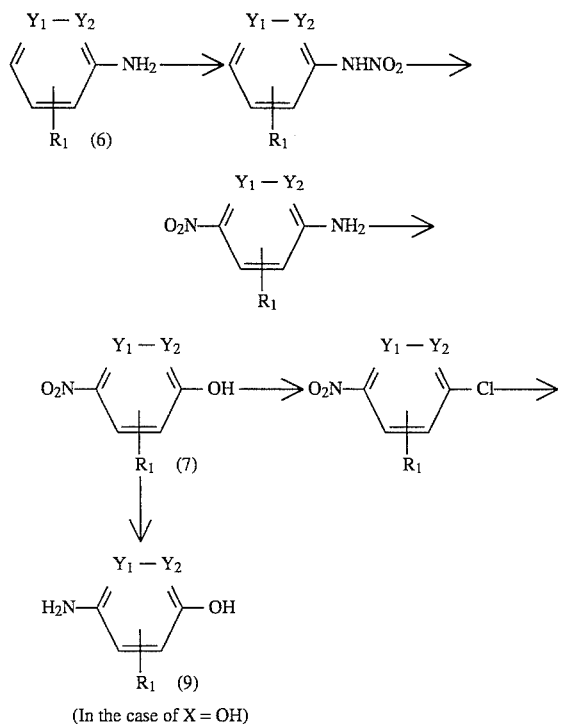

(In the case of X = OH)

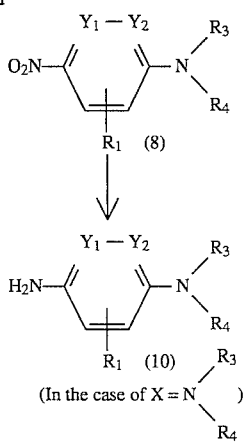

(In the case of X = N⟨R3/R4⟩)

The intermediate compounds (7) and (8) having a nitro group are synthesized by the method described in Chem. Ber., 85, 1012 (1952) or J. Am. Chem. Soc., 74(1952)3828. The intermediate compound (8) having a nitro group is also synthesized by reacting compound (6) with an alkyl halide in a solvent such as xylene or toluene in the presence of a base such as NaNH$_2$ or NaH to obtain a mono or di-alkylated amino compound and nitrating the alkylated amino compound. The nitration is carried out by the well-known method or preferably by using nitric acid having a gravity of 1.38 to 1.52/sulfuric acid and/or acetic acid. It is preferable that the amount used of nitric acid is 0.8 to 1.8 times by mole that of the dialkylated compound and the reaction temperature is −10° to 20° C.

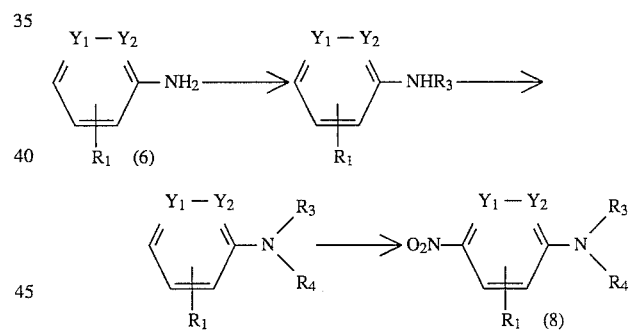

The Compounds (7) and (8) are reduced by a hydrogen reduction (using a catalyst, Pd/C or Raney Nickel) under an atmospheric pressure or increased pressure or a chemical reduction (reduced iron/acetic acid, tin/hydrochloride or hydrosulfite/methanol-water to obtain compounds (9) and (10).

Next, the heat sensitive transfer material using the dye of the invention is described. The heat sensitive transfer material has, on a support, a dye-containing layer comprising at least a dye and a binder.

The content of the dye is preferably 0.05 to 10 g per m² of the support. Preferred binders are solvent-soluble polymers such as acrylate resins, methacrylate resins, polystyrenes, polycarbonates, polysulfones, polyether sulfones, polyvinyl butyrals, polyvinyl acetals, nitrocellulose, ethyl cellulose and the likes. These binders may be used, singly or in combination of two or more kinds, by being dissolved in an organic solvent or in the form of a dispersion as latex. Preferably, these binders are used in an amount of 0.1 to 20 g per m² of the support. The dye-containing layer can be formed by coating, on a support, an ink for the formation of heat sensitive transfer layer prepared by dissolving a dye and a binder in a solvent, or by dispersing them in a solvent into fine particles, and then drying the coated ink. The dry thickness of the dye-containing layer is preferably 1 to 10 μm. The support used in the invention may be any of the conventional ones as long as it has a good dimensional stability and can withstand the heat applied by a thermal head during recording; preferred are tissue paper such as condenser paper and glassine paper, and films of heat-resistant plastics such as polyethylene terephthalates, polyamides and polycarbonates. The thickness of the support is preferably 2 to 30 μm. In order to improve adhesion of the support to the binder and to prevent the dye from transferring or migrating to the support, it is preferred that a subbing layer comprising a selected polymer be provided. Further, a slipping layer may be provided on the reverse side of the support (oppositely with the dye-containing layer) in order to prevent a thermal head from sticking to the support. In applying the heat sensitive transfer material of the invention to a heat sensitive transfer material for full color image recording, it is preferred that a yellow heat sensitive transfer layer containing a yellow dye, a magenta heat sensitive transfer layer containing the magenta dye of the invention and a cyan heat sensitive transfer layer containing a cyan dye, three layers in total, be repeatedly coated in order on the same surface of the support. If necessary, four heat sensitive layers comprising a black image forming layer and the above three layers may be repeatedly coated in order on the same surface of the support. In carrying out image recording by use of the heat sensitive transfer material of the invention, the dye-containing layer of the heat sensitive transfer material is superposed on an image receiving material, and then heat is applied, correspondingly to image information, to the heat sensitive transfer material to form an image on the image receiving material, and then the image receiving material is separated from the heat sensitive transfer material. As the image receiving material, use is made of one comprising a support having thereon an image receiving layer. Preferred supports for the image receiving material include paper, plastic films and paper-plastic film composites.

Typical examples of the support include those described from the 17th line in the upper right column to the 11th line of the lower left column on page 5 of the specification of Japanese Pat. O.P.I. Pub. No. 54556/1991. The image receiving layer is made of a polymer binder. Preferred polymer binders are thermoplastic polymers such as polyester resins, polyvinyl chloride resins, copolymers of vinyl chloride with other monomers (e.g., vinyl acetate, etc.), polyvinyl butyrals, polyvinyl pyrrolidones and polycarbonates, and these are formed into a polymer layer singly or in combination of two or more kinds.

Besides the utilization in heat sensitive transfer materials, the dye of the invention can be used in other image forming materials including those for ink jet type as well as in image display materials including color filters.

EXAMPLES

The invention is described in detail with the following examples, but the embodiment of the invention is not limited to them.

Example 1

Synthesis and Evaluation of Dye
1. Synthesis of Dye D-1
Synthesis of Intermediate (A)

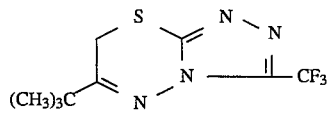

Intermediate (A)

To 100 ml of acetonitrile was added 10.6 g of 5-t-butyl-2-hydrazinothiadiazine, and further 10 g of anhydrous trifluoroacetic acid was added with stirring, the reaction liquor was then stirred for 1 hour. After distilling away acetonitrile, ethyl acetate was added to obtain an ethyl acetate solution. The ethyl acetate solution was washed with water and with an aqueous solution of sodium carbonate and then separated and dried. Removal of the ethyl acetate by distillation gave 12.4 g of intermediate (A).
Synthesis of Coupler (A)

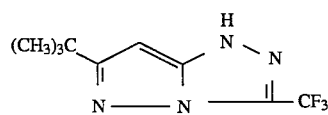

Coupler (A)

A mixture of 12 g of intermediate (A) and 50 ml of acetic anhydride was stirred for 30 hours. After distilling away the solvent, 100 ml of methanol and 10 ml of concentrated hydrochloric acid were added, and the reaction liquor was stirred for 2 hours, followed by suction filtration. Ethyl acetate and a saturated saline solution were added to the filtrate. The ethyl acetate solution was separated, washed further with an aqueous solution of sodium hydrogencarbonate and with the saturated saline solution and dried, followed by removal of the ethyl acetate by distillation. Thus, 7.2 g of coupler (A) was obtained.
Synthesis of Dye D-1

To a mixture of 4.0 g of coupler (A) and 200 ml of methanol was added 3.1 g of 2-methyl-3-amino-6-N,N-diethylaminopyridine, and further 20 ml of an aqueous solution containing 9.1 g of sodium carbonate was added with stirring. Then, 20 ml of an aqueous solution containing 4.3 g of ammonium persulfate was added dropwise, followed by a 2-hour stirring. After depositing crystals by adding water thereto, the resulting crystals were filtered out and recrystallized from acetonitrile, so that 13.5 g of dye D-1 was obtained; the melting point was 143° to 145° C.
2. Synthesis of Dye D-2
Synthesis of Intermediate (B)

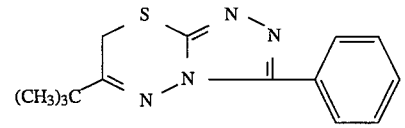

Intermediate (B)

To an acetonitrile solution containing 30 g of 5-t-butyl-2-hydrazinothiadiazine was added dropwise at room temperature a mixed solution containing 21 g of benzyl chloride and 50 ml of acetonitrile, the reaction liquor was stirred further for 2 hours.

The reaction liquor was filtered and, after concentrating the filtrate, ethyl acetate was added. The resulting crystals were filtered out, washed with ethyl acetate. Intermediate (B) was thus prepared in a yield of 27.6 g.

Synthesis of Dye D-2

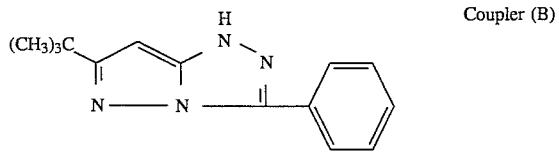

Coupler (B)

Using 27 g of intermediate (B), coupler (B) was synthesized in a yield of 14.5 g in a manner similar to that of coupler (A). Subsequently, 4.7 g of dye D-2 was obtained from 5.0 g of coupler (B) in a manner similar to that of dye D-1. The melting point of the dye was 199° to 201° C. The absorption spectra of dyes D-1 and D-2 in acetone solutions are shown in FIG. 1, where the absorbance is plotted as axis of ordinate and the wavelength as axis of abscissa.

In FIG. 1, 1 designates a spectral absorption curve of dye D1 and 2 designates a spectral absorption curve of dye D2.

The molar absorption coefficients of dyes D-1 and D-2 were 52300 and 44000, respectively.

That is, the dyes of the invention have excellent spectral absorption characteristics as magenta dyes and also have large molar absorption coefficients. In addition, these can be easily synthesized.

The chemical structure of the resulting dyes was confirmed as shown below by nmr and mass.

Dye D-1:

As a result of mass measurement, $M^+$ was 416.

Results of nmr measurement are as follows ($CDCl_3$): δ (ppm): 1.25 (t 6H), 1.60 (s 9H), 2.70 (s 3H), 3.65 (q 4H), 6.63 (d 1H), 7.50 (m 3H), 8.37 (d 2H), and 9.53 (d 1H)

Dye D-2:

As a result of mass measurement, $M^+$ was 408.

Results of nmr measurement are as follows ($CDCl_3$): δ (ppm): 1.28 (t 6H), 1.58 (s 9H), 2.70 (s 3H), 3.50 (q 4H), 6.68 (d 1H) and 9.43 (d 1H)

|  |  | Calculated value % | Observed value % |
|---|---|---|---|
| Dye D-1 | C: | 56.01 | 55.9 |
|  | H: | 5.93 | 6.1 |
|  | N: | 24.06 | 23.8 |
|  | F: | 14.00 | 14.2 |
| Dye D-2 | C: | 69.37 | 70.2 |
|  | H: | 7.03 | 7.1 |
|  | N: | 23.60 | 22.7 |

The spectral absorbance curves of Dyes D-1 and D-2 shown in FIG. 1 were measured by the use of an HITACHI automatic recording type spectral photometer Model U-3300 produced by Hitachi Seisakusho Co., Ltd.

Example 2

Preparation of Heat Sensitive Transfer Material and Image Evaluation

Preparation of Ink

A uniform ink solution containing the dye of the invention was obtained by mixing the following materials:

| Dye (D-1) | 5 g |
|---|---|
| Polyvinyl butyral resin | 5 g |
| (BL-1 made by Sekisui Chemical Co., Ltd) |  |
| Methyl ethyl ketone | 200 ml |

Preparation of Heat Sensitive Transfer Material

Heat sensitive transfer material-1 comprising a polyethylene terephthalate film having thereon a heat sensitive transfer layer was prepared by coating the above ink with a wire bar on a 4.5-μm thick polyethylene terephthalate base and drying the ink so as to give a dry coating thickness of 0.8 g/m². Further, a nitrocellulose layer containing a silicone-modified urethane resin (SP-2105 made by Dainichiseika Co., Ltd.) was provided, as an antisticking layer, on the opposite side to the transfer layer of the film.

Preparation of Image Receiving Material

Image receiving material-1 was prepared by coating, as an image receiving layer, a methyl ethyl ketone solution of polyester resin containing an ester-modified silicone (coating weight: 0.15 g/m²), on one side (laminated with polyethylene containing a white pigment ($TiO_2$) and a bluing agent) of a paper support laminated with polyethylene on both sides, so as to give a polyester resin coating weight of 5 g/m².

Formation of Heat Sensitive Transfer Image

Heat sensitive transfer material-1 was superposed on image receiving material-1, and an image recording was performed under the following conditions by applying a thermal head to the reverse side of the heat sensitive transfer material. A magenta image (image-1) of excellent gradation was obtained.

The maximum density of the image is shown in Table 1.

Recording Conditions

Recording densities in primary scanning and secondary scanning: 8 dots/mm

Recording power: 0.6 W/dot

Heating time: heating time was adjusted stepwise within the range of 20 msec to 0.2 msec.

Heat sensitive transfer materials-2 to 7 and comparative heat sensitive transfer materials-8 to 10 were prepared by repeating the procedure of heat sensitive transfer material-1, except that a dye in heat sensitive transfer material-1 was changed to dyes shown in Table 1. Images-2 to 10 were formed in the same manner as in image-1; densities of those images are shown in Table 1.

Evaluation of Light Fastness

The images obtained were irradiated with light in a xenon fadeometer to examine light fastness. With regard to evaluation on light-fastness shown in Example 2, the density before and after exposing the resulting images to 100 $K_J$ using a Xenon Fade-O-Meter Model WEL-6X-HC-EC with 7 kw (produced by Suga) was measured using an X-rite 310 (produced by X-rite Co., Ltd.). Residual dye rates after irradiation, which were calculated by the equation $D/D_0 \times 100$ (wherein $D_0$ is a density before irradiation of light), are shown in Table 1. The chemical structures of dyes A, B and C listed in Table 1 are shown later. Dye A is described in Japanese Patent O.P.I. Publication No. 64/63194/1989, dye B in Japanese Patent O.P.I. Publication No. 4/178,646/1992, and dye C in Japanese Patent O.P.I. Publication No. 4/89, 287/1992.

Evaluation of Storage Stability of Heat Sensitive Transfer Material

TABLE 1
| | Dye | Substituent (σp value) | | Dmax | Residual Dye rate | Remarks |
|---|---|---|---|---|---|---|
| Image-1 | D-1 | —CF₃ | (0.54) | 2.28 | 85% | Invention |
| Image-2 | D-2 | phenyl | (−0.01) | 2.20 | 89% | Invention |
| Image-3 | D-3 | 2-chlorophenyl | (>−0.01) | 2.12 | 82% | Invention |
| Image-4 | D-5 | —CF₃ | (0.54) | 2.18 | 86% | Invention |
| Image-5 | D-9 | 3-methylphenyl | (−0.01) | 2.19 | 88% | Invention |
| Image-6 | D-20 | —CF₃ | (0.54) | 1.98 | 81% | Invention |
| Image-7 | D-22 | 4-(SO₂CH₃)phenyl | (>−0.01) | 2.16 | 82% | Invention |
| Image-8 | A | — | | 2.12 | 29% | Comparative |
| Image-9 | B | — | | 1.36 | 89% | Comparative |
| Image-10 | C | —C₂H₅ —C(CH₃)₃ | (−0.15) (−0.20) | 1.96 | 75% | Comparative |
Dye A
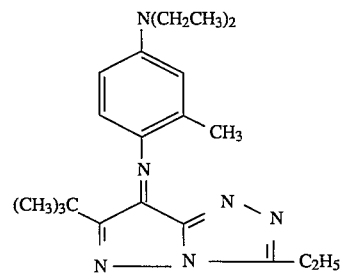
Dye B
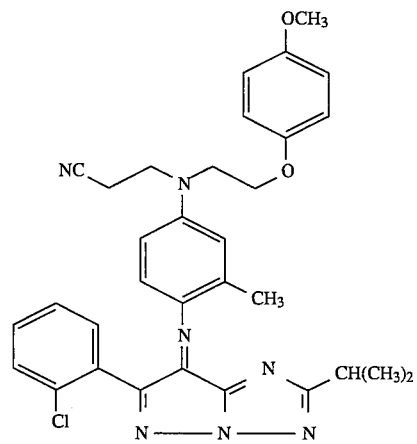
Dye C TABLE 1-continued

| Dye | Substituent (σp value) | Dmax | Residual Dye rate | Remarks |
|---|---|---|---|---|

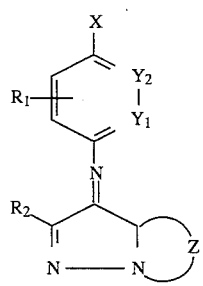

Incidentally, the color of image-10 (comparative sample-10) was not magenta but orange.

As is shown in Table 1, the heat sensitive transfer materials using the dyes of the invention can provide not only higher image densities as compared with comparative material-9 (image-9) but also better light fastnesses as compared with comparative material-8 (image-8), because of their superior dye transferring properties.

Moreover, the images formed by use of the materials of the invention were excellent in magenta tone. As is apparent from the above, the dyes of the invention each have a large absorption coefficient, a sharp absorption less in secondary absorption and a good light fastness. Accordingly, the dyes of the invention can exhibit excellent properties when used in image-forming materials including heat sensitive transfer materials.

What is claimed is:

1. An image forming dye represented by the following Formula (1):

wherein $R_1$ represents a hydrogen atom, a halogen atom, a substituted or unsubstituted alkyl group, a substituted or unsubstituted cycloalkyl group, a substituted or unsubstituted alkoxy group, a substituted or unsubstituted aryl group, a substituted or unsubstituted aryloxy group, a substituted or unsubstituted aralkyl group, a substituted or unsubstituted acylamino group, a substituted or unsubstituted sulfonylamino group, a substituted or unsubstituted ureido group, a substituted or unsubstituted alkylthio group, a substituted or unsubstituted alkoxycarbonyl group, a substituted or unsubstituted carbamoyl group, a substituted or unsubstituted acyl group, a substituted or unsubstituted amino group, a substituted or unsubstituted sulfonyl group or a substituted or unsubstituted sulfamoyl group; $R_2$ represents a substituted or unsubstituted alkyl group, a substituted or unsubstituted cycloalkyl group, a substituted or unsubstituted alkoxy group, a substituted or unsubstituted aryl group, a substituted or unsubstituted aryloxy group, a substituted or unsubstituted aralkyl group, a substituted or unsubstituted acylamino group, a substituted or unsubstituted sulfonylamino group, a substituted or unsubstituted ureido group, a substituted or unsubstituted alkylthio group, a substituted or unsubstituted alkoxycarbonyl group, a substituted or unsubstituted carbamoyl group, a substituted or unsubstituted acyl group, a substituted or unsubstituted amino group, a substituted or unsubstituted alkylsulfonyl group or a substituted or unsubstituted sulfamoyl group; X represents a hydroxy group or a $N(R_3R_4)$ group wherein $R_3$ and $R_4$ independently represent a substituted or unsubstituted alkyl, alkenyl, aryl, aralkyl group or cycloalkyl group, provided that $R_3$ and $R_4$ may combine with each other or with $R_1$ to form a ring; $Y_1$ and $Y_2$ independently represent a carbon atom or a nitrogen atom, provided that one of $Y_1$ and $Y_2$ is a nitrogen atom; and Z represents an atomic group necessary to form a substituted or unsubstituted 5- or 6-membered nitrogen-containing heterocyclic ring which may be condensed with another ring, provided that one of $R_2$ and a substituent on the ring represented by Z represents a group having a Hammett's value of not less than −0.05.

2. The dye of claim 1, wherein said $R_1$ is selected from the group consisting of an alkyl group, a cycloalkyl group, an alkoxy group, an aryl group, an aryloxy group, an aralkyl group, an acylamino group, a sulfonylamino group, a ureido group, an alkylthio group, an alkoxycarbonyl group, a carbamoyl group, an acyl group, an amino group, an alkyl sulfonyl group or a sulfamoyl group, provided that each group may have a substituent.

3. The dye of claim 1, wherein said group having a Hammett's value of not less than −0.05 is selected from the group consisting of an aryl group, a halogen-substituted alkyl group, a cyano group, an alkylsulfonyl group, an alkylsulfinyl group, a sulfamoyl group, a carbamoyl group and an alkoxycarbonyl group.

4. The dye of claim 1, wherein the dye is represented by the following Formulas (2) and (3):

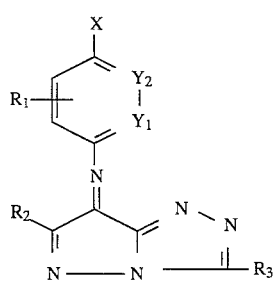

Formula (2)

-continued

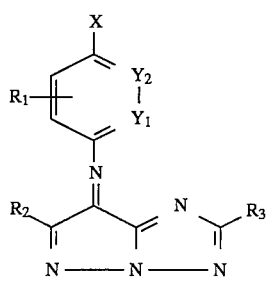

Formula (3)

wherein $R_1$ represents a hydrogen atom, a halogen atom, a substituted or unsubstituted alkyl group, a substituted or unsubstituted cycloalkyl group, a substituted or unsubstituted alkoxy group, a substituted or unsubstituted aryl group, a substituted or unsubstituted aryloxy group, a substituted or unsubstituted aralkyl group, a substituted or unsubstituted acylamino group, a substituted or unsubstituted sulfonylamino group, a substituted or unsubstituted ureido group, a substituted or unsubstituted alkylthio group, a substituted or unsubstituted alcoxycarbonyl group, a substituted or unsubstituted carbamoyl group, a substituted or unsubstituted acyl group, a substituted or unsubstituted amino group, a substituted or unsubstituted sulfonyl group or a substituted or unsubstituted sulfamoyl group; $R_2$ represents a substituted or unsubstituted alkyl group, a substituted or unsubstituted cycloalkyl group, a substituted or unsubstituted alkoxy group, a substituted or unsubstituted aryl group, a substituted or unsubstituted aryloxy group, a substituted or unsubstituted aralkyl group, a substituted or unsubstituted acylamino group, a substituted or unsubstituted sulfonylamino group, a substituted or unsubstituted ureido group, a substituted or unsubstituted alkylthio group, a substituted or unsubstituted alkoxycarbonyl group, a substituted or unsubstituted carbamoyl group, a substituted or unsubstituted acyl group, a substituted or unsubstituted amino group, a substituted or unsubstituted alkylsulfonyl group or a substituted or unsubstituted sulfamoyl group; X represents a hydroxy group or a $N(R_3R_4)$ group wherein $R_3$ and $R_4$ independently represent a substituted or unsubstituted alkyl, alkenyl, aryl, aralkyl group or cycloalkyl group, provided that $R_3$ and $R_4$ may combine with each other or with $R_1$ to form a ring; $Y_1$ and $Y_2$ independently represent a nitrogen atom or a $C(R_6)$ wherein $R_6$ represents a hydrogen atom, a halogen atom, an alkyl group or an acylamino group, provided that one of $Y_1$ and $Y_2$ is a nitrogen atom; and $R_5$ is selected from the group consisting of a substituted or unsubstituted alkyl group, a substituted or unsubstituted cycloalkyl group, a substituted or unsubstituted alkoxy group, a substituted or unsubstituted aryl group, a substituted or unsubstituted aryloxy group, a substituted or unsubstituted aralkyl group, a substituted or unsubstituted acylamino group, a substituted or unsubstituted sulfonylamino group, a substituted or unsubstituted ureido group, a substituted or unsubstituted alkylthio group, a substituted or unsubstituted alkoxycarbonyl group, a substituted or unsubstituted carbamoyl group, a substituted or unsubstituted acyl group, a substituted or unsubstituted amino group, a substituted or unsubstituted alkylsulfonyl group or a substituted or unsubstituted sulfamoyl group, provided that one of $R_2$ and $R_5$ has a Hammett's value of not less than −0.05.

5. The dye of claim 4, wherein said $R_1$ is selected from the group consisting of an alkyl group, a cycloalkyl group, an alkoxy group, an aryl group, an aryloxy group, an aralkyl group, an acylamino group, a sulfonylamino group, a ureido group, an alkylthio group, an alkoxycarbonyl group, a carbamoyl group, an acyl group, an amino group, an alkylsulfonyl group or a sulfamoyl group, provided that each may have a substituent.

6. The dye of claim 4, wherein said $R_2$ and $R_5$ in Formulas (2) and (3) are selected from the group consisting of an aryl group, a halogen-substituted alkyl group, an alkylsulfonyl group, an alkylsulfinyl group, a sulfamoyl group, a carbamoyl group and an alkoxycarbonyl group.

7. The dye of claim 1, wherein in Formula (1) said $Y_1$ and $Y_2$ independently represent a nitrogen atom or $C(R_6)$ wherein $R_6$ represents a hydrogen atom, a halogen atom, an alkyl group or acylamino group, provided that one of $Y_1$ and $Y_2$ is a nitrogen atom.

8. The dye of claim 1 selected from the group consisting of:

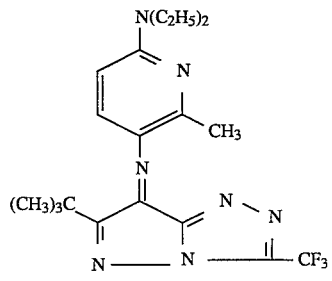

D-1

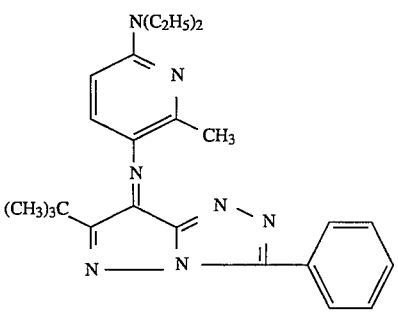

D-2

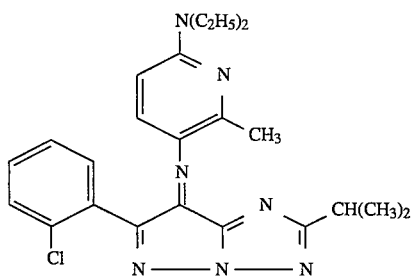

D-3

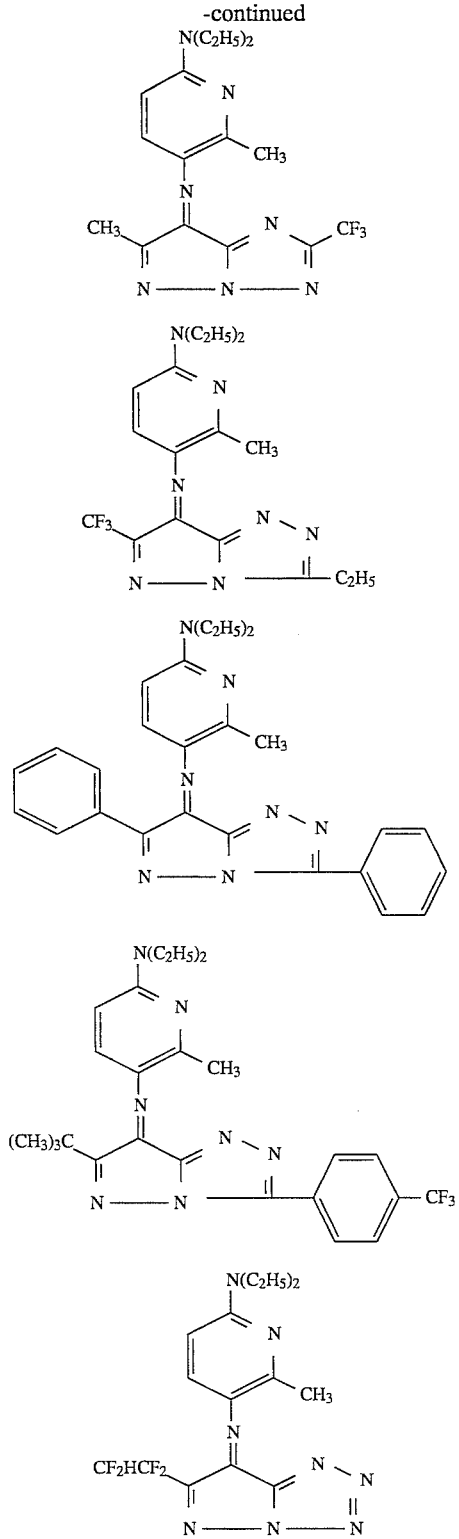
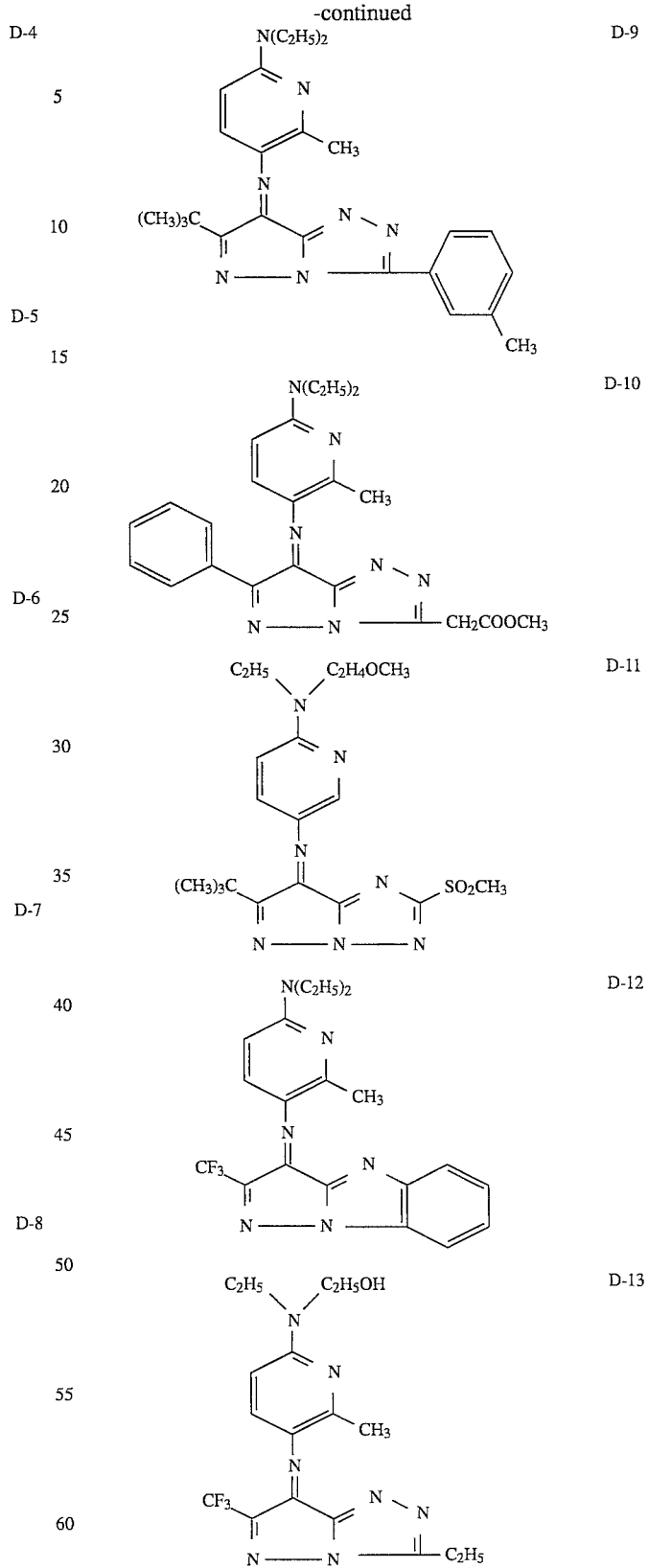

-continued
 D-14
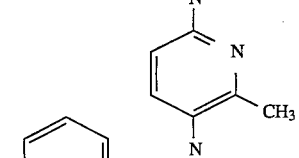 D-15
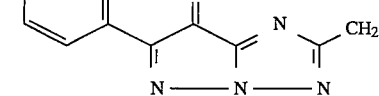 D-16
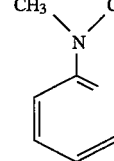 D-17
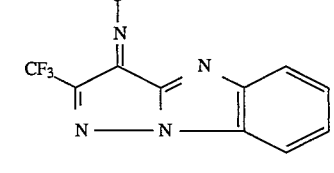 D-18
-continued
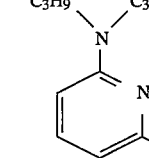 D-19
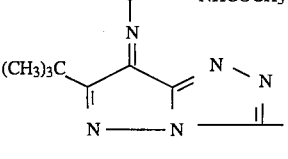 D-20
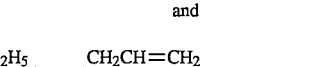 D-21
and
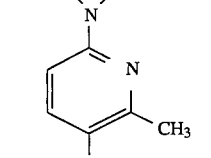 D-22
9. The dye D-9 of claim 8.
* * * * *